United States Patent
Baluja et al.

(10) Patent No.: US 12,175,740 B2
(45) Date of Patent: Dec. 24, 2024

(54) METHODS AND SYSTEMS FOR ENCODING IMAGES

(71) Applicant: Google LLC, Mountain View, CA (US)

(72) Inventors: Shumeet Baluja, Leesburg, VA (US); Rahul Sukthankar, Orlando, FL (US)

(73) Assignee: GOOGLE LLC, Mountain View, CA (US)

( * ) Notice: Subject to any disclaimer, the term of this patent is extended or adjusted under 35 U.S.C. 154(b) by 499 days.

(21) Appl. No.: 17/614,929

(22) PCT Filed: May 28, 2019

(86) PCT No.: PCT/US2019/034122
§ 371 (c)(1),
(2) Date: Nov. 29, 2021

(87) PCT Pub. No.: WO2020/242452
PCT Pub. Date: Dec. 3, 2020

(65) Prior Publication Data
US 2022/0237882 A1 Jul. 28, 2022

(51) Int. Cl.
*G06V 10/94* (2022.01)
*G06V 10/774* (2022.01)
*G06V 10/82* (2022.01)

(52) U.S. Cl.
CPC ............ *G06V 10/95* (2022.01); *G06V 10/774* (2022.01); *G06V 10/82* (2022.01)

(58) Field of Classification Search
CPC ...... G06V 40/176; G06V 40/19; G06F 3/017; G06N 20/00; G06N 3/02; G06N 20/10; G08B 21/06; G08V 40/20; A01M 1/026
See application file for complete search history.

(56) References Cited

U.S. PATENT DOCUMENTS 9,811,765 B2 * 11/2017 Wang ................ G06F 18/24143
10,191,558 B2 * 1/2019 Parshionikar ........ G06V 40/176
10,565,518 B2 * 2/2020 Jin ......................... G06N 20/00
(Continued)

OTHER PUBLICATIONS

International Search Report and Written Opinion for PCT/US2019/034122, mailed Feb. 20, 2020, 17 pages.
(Continued)

*Primary Examiner* — Yosef Kassa
(74) *Attorney, Agent, or Firm* — DORITY & MANNING P.A.

(57) ABSTRACT

The present disclosure is directed to encoding images. In particular, one or more computing devices can receive data representing one or more machine learning (ML) models configured, at least in part, to encode images comprising objects of a particular type. The computing device(s) can receive data representing an image comprising one or more objects of the particular type. The computing device(s) can generate, based at least in part on the data representing the image and the data representing the ML model(s), data representing an encoded version of the image that alters at least a portion of the image comprising the object(s) such that when the encoded version of the image is decoded, the object(s) are unrecognizable as being of the particular type by one or more object-recognition ML models based at least in part upon which the ML model(s) configured to encode the images were trained.

17 Claims, 4 Drawing Sheets

(56) References Cited

U.S. PATENT DOCUMENTS

| | | | | |
|---|---|---|---|---|
| 10,616,467 B2* | 4/2020 | Wang | ............... | H04N 13/232 |
| 10,712,738 B2* | 7/2020 | Cella | ................ | H04W 4/38 |
| 10,748,062 B2* | 8/2020 | Rippel | ............ | G06V 30/19147 |
| 10,849,320 B2* | 12/2020 | Files | ................ | A01M 31/002 |
| 10,866,584 B2* | 12/2020 | Cella | ................ | H04L 67/1097 |
| 10,983,507 B2* | 4/2021 | Cella | ................ | G05B 23/0221 |
| 2018/0336463 A1 | 11/2018 | Bloom | | |

OTHER PUBLICATIONS

Agustsson et al., "Generative Adversarial Networks for Extreme Learned Image Compression", arXiv:1804.02958v3, Aug. 18, 2019, 26 pages.

Belagiannis et al., "Adversarial Network Compression", arXiv:1803.10750v2, Nov. 14, 2018, 18 pages.

Han et al., "Deep Generative Video Compression", arXiv:1810.02845v2, Nov. 1, 2019, 15 pages.

Mirjalili et al., "Semi-Adversarial Networks: Convolutional Autoencoders for Imparting Privacy to Face Images", arXiv:1712.00321v3, May 3, 2018, 8 pages.

Shetty et al., "Adversarial Scene Editing: Automatic Object Removal from Weak Supervision", arXiv:1806.01911v1, Jun. 5, 2018, 13 pages.

International Preliminary Report on Patentability for Application No. PCT/US2019/034122, mailed Dec. 9, 2021, 13 pages.

\* cited by examiner

I → OBJECT-RECOGNITION MODEL(S) → V1, V2, ... VN

FOR EACH V
  IF V INCLUDES OBJECT(S) DESIGNATED PRIVATE
    MODIFY V

I → ENCODING MODEL(S) → DECODING MODEL(S) → I'

I' → OBJECT-RECOGNITION MODEL(S) → V'1, V'2, ... V'N

DETERMINE ERROR, E.G., (V'1-V1) + (V'2-V2) + ... (V'N-VN)

MODIFY ENCODING/DECODING MODEL(S) TO REDUCE ERROR

METHODS AND SYSTEMS FOR ENCODING IMAGES

PRIORITY CLAIM

This application is based upon and claims the right of priority under 35 U.S.C. § 371 to International Application No. PCT/US2019/034122 filed on May 28, 2019. Applicant claims priority to and the benefit of each of such applications and incorporates all such applications herein by reference in their entirety.

FIELD

The present disclosure relates generally to digital imagery. More particularly, the present disclosure relates to encoding images.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A popular use of such devices is generating, manipulating, communicating, and/or the like digital imagery (e.g., pictures, video, and/or the like).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices, data representing one or more machine learning (ML) models configured, at least in part, to encode images comprising objects of a particular type. The method can also include receiving, by the computing device(s), data representing an image comprising one or more objects of the particular type. The method can further include generating, by the computing device(s) and based at least in part on the data representing the image and the data representing the ML model(s), data representing an encoded version of the image that alters at least a portion of the image comprising the object(s) such that when the encoded version of the image is decoded, the object(s) are unrecognizable as being of the particular type by one or more object-recognition ML models based at least in part upon which the ML model(s) configured to encode the images were trained.

Another example aspect of the present disclosure is directed to a system. The system can include one or more processors and a memory storing instructions that when executed by the processor(s) cause the system to perform operations. The operations can include receiving, from a remotely located computing device, data representing an encoded version of an image comprising one or more objects of a particular type. The encoded version of the image can alter at least a portion of the image comprising the object(s) such that when the encoded version of the image is decoded, the object(s) are unrecognizable as being of the particular type by one or more object-recognition machine learning (ML) models. The operations can also include identifying data representing one or more ML models generated based at least in part on the object-recognition ML model(s). The operations can further include generating, based at least in part on the data representing the encoded version of the image and the data representing the ML model(s) generated based at least in part on the object-recognition ML model(s), data representing a decoded version of the image in which the object(s) are unrecognizable as being of the particular type by the object-recognition ML model(s).

A further example aspect of the present disclosure is directed to one or more non-transitory computer-readable media. The non-transitory computer-readable media can comprise instructions that when executed by one or more computing devices cause the computing device(s) to perform operations. The operations can include receiving data representing a plurality of different and distinct images that includes at least one image comprising an object of a particular type. The operations can also include generating, based at least in part on the data representing the plurality of different and distinct images and one or more object-recognition machine learning (ML) models, one or more ML models configured to encode images comprising one or more objects of the particular type such that when the images are decoded, the object(s) are unrecognizable as being of the particular type by the object-recognition ML model(s).

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Example aspects of the present disclosure are directed to encoding images (e.g., static images, animated images, video frames, and/or the like). Specifically, aspects of the present disclosure are directed to generating and utilizing one or more machine learning (ML) models to encode images such that one or more portions of the images that include one or more objects of one or more particular types (e.g., people, specific types of animals, certain types of inanimate objects, and/or the like) are altered (e.g., in order to provide privacy, and/or the like). In accordance with aspects of the disclosure, the ML model(s) configured to encode the images can be generated based at least in part on one or more object-recognition ML models and can be configured to encode the images such that the image portion(s) that include the object(s) of the particular type(s) are altered such that when the images are decoded, the object(s) are unrecognizable as being of the particular type(s) by the object-recognition ML model(s). In some embodiments, the object-recognition ML model(s) can be utilized to generate (e.g., train, and/or the like) the ML model(s) configured to encode the images such that objects recognized in the images by the object-recognition ML model(s) and designated for privacy are not recognized in decoded versions of the images by the object-recognition ML model(s), while other objects recognized in the images by the object-recognition ML model(s) are also recognized in the decoded versions of the images by the object-recognition ML model(s).

For example, one or more computing devices (e.g., computers, mobile devices, and/or the like) can receive (e.g., from a camera, memory, network interface, and/or the like) data representing an image. The image can include various objects (e.g., a person's face, a dog, the license plate of a car, and/or the like). Based at least in part on the data representing the image and one or more ML models configured to encode images, the computing device(s) can generate data representing an encoded version of the image, encode the image, and/or the like.

The ML model(s) can be configured to encode the images such that one or more portions of the images that include one or more objects of one or more particular types are altered. For example, the ML model(s) can have been generated based at least in part on data (e.g., associated with one or more privacy settings, and/or the like) indicating that image portions including objects of one or more particular types (e.g., people's faces, car license plates, and/or the like) should be altered for privacy, while image portions including objects of one or more other types (e.g., dogs, and/or the like) need not be altered for privacy, and/or the like. Such data can be based at least in part on, for example, one or more user preferences, device settings, application settings, device locations, jurisdictional regulations, privacy policies, and/or the like.

The computing device(s) can communicate the data representing the encoded version of the image to a remotely located computing system (e.g., server, and/or the like), which can receive the data. Based at least in part on the data representing the encoded version of the image and one or more ML models configured to decode images, the remotely located computing system can generate data representing a decoded version of the image, decode the image, and/or the like.

In some embodiments, the remotely located computing system, can utilize one or more object-recognition ML models to identify (e.g., recognize, and/or the like) one or more objects (e.g., the dog, and/or the like) in the decoded version of the image as being of their respective type(s) (e.g., as being a dog, and/or the like). The object-recognition ML model(s) may, however, fail to identify (e.g., recognize, and/or the like) one or more other objects (e.g., the person's face, the license plate of the car, and/or the like) in the decoded version of the image as being of their respective type(s) (e.g., as being a person's face, car license plate, and/or the like) because the portion(s) of the image including such object(s) have been altered by the encoding and/or decoding such that the object(s) (e.g., the person's face, the license plate of the car, and/or the like) are unrecognizable as being of their respective type(s) (e.g., as being a person's face, car license plate, and/or the like) by the object-recognition ML model(s). For example, as will be described in greater detail below, the ML model(s) configured to encode the images can have been generated in conjunction with the ML model(s) configured to decode the images, and their generation can have been based at least in part on the object-recognition ML model(s).

In some embodiments, the remotely located computing system, can utilize one or more ML models (e.g., autoencoder networks, generative adversarial networks (GANs), and/or the like) to reconstruct, in the decoded version of the image, one or more portions of the image comprising one or more of the object(s) (e.g., the person's face, the license plate of the car, and/or the like) such that a human viewing a rendering of the decoded version of the image can identify (e.g., recognize, and/or the like), in the rendering, such object(s) as being of their respective type(s) (e.g., as being a person's face, car license plate, and/or the like).

In some embodiments, the ML model(s) configured to encode the images can include a single common (e.g., the same, and/or the like) ML model configured to encode the images such that one or more portions of the images that include one or more of multiple different types of objects (e.g., people's faces, car license plates, and/or the like) are altered. Additionally or alternatively, the ML model(s) configured to encode the images can include multiple different and distinct ML models, and each of such ML model(s) can be configured to encode the images such that one or more portions of the images that include one or more of multiple different types of objects are altered. For example, the ML models can include an ML model configured to encode the images to generate data representing modified versions of the images that alter one or more portions of the images that include objects of a first type (e.g., people's faces, and/or the like), and the ML models can include a different and distinct ML model, which can be configured to encode decoded versions of the modified versions of the images such that one or more portions of the images (e.g., included in the modified versions of the images, and/or the like) that include objects of a second type (e.g., car license plates, and/or the like) are altered.

As previously indicated, the ML model(s) configured to encode the images can be generated (e.g., trained, and/or the like) in conjunction with the ML model(s) configured to decode the images, and such generation can be based at least in part on the object-recognition ML model(s). For example, one or more computing devices (e.g., associated with the remotely located computing system, and/or the like) can receive data (e.g., training data, and/or the like) representing multiple different and distinct images, and based at least in part on such data and the object-recognition ML model(s), the computing device(s) can generate one or more of the ML model(s) configured to encode the images and/or one or more of the ML model(s) configured to decode the images. Such images can include at least one image comprising one or more objects of the particular type(s) (e.g., people's faces, car license plates, and/or the like) for which image portions including objects of the particular type(s) should be altered (e.g., for privacy, and/or the like).

In some embodiments, generating one or more of the ML model(s) configured to encode the images and/or one or more of the ML model(s) configured to decode the images can include processing (e.g., training one or more of such ML model(s) based at least in part on, and/or the like) each image of the multiple different and distinct images represented by the received data (e.g., the training data, and/or the like). Processing an image of such multiple different and distinct images can include, for example, generating, based at least in part on the object-recognition ML model(s), data (e.g., one or more multi-dimensional vectors, and/or the like) representing one or more objects identified in the image; generating, based at least in part on the ML model(s) configured to encode the images, data representing an encoded version of the image; and generating, based at least in part on the data representing the encoded version of the image and the ML model(s) configured to decode the images, data representing a decoded version of the image.

Processing of the image can further include generating, based at least in part on the object-recognition ML model(s), data (e.g., one or more multi-dimensional vectors, and/or the like) representing one or more objects identified in the decoded version of the image; determining a difference (e.g., discrepancy, error, and/or the like) between the data representing the object(s) identified in the image and the data representing the object(s) identified in the decoded version of the image; and modifying one or more of the ML model(s) configured to encode the images and/or one or more of the ML model(s) configured to decode the images such that the modifying reduces the difference between the data representing the object(s) identified in the image and the data representing the object(s) identified in the decoded version of the image, for example, by evaluating a function based at least in part on the difference (e.g., back-propagating the difference through one or more of such ML model(s), utilizing one or more evolutionary algorithms, other suitable ML training paradigms, and/or the like). The difference can be determined at any suitable level (e.g., L1, L2, and/or the like), using any suitable approach (e.g., simple error, absolute value, sum of squares, and/or the like). It will be appreciated that by processing the images in such a manner, the ML model(s) can be configured to minimize, reduce, and/or the like the difference in the objects identified, as opposed to, for example, traditional compression, which seeks to minimize, reduce, and/or the like the pixel-wise difference.

In some embodiments, for each image of the multiple different and distinct images that includes one or more objects of the particular type(s) (e.g., people's faces, car license plates, and/or the like) for which image portions including objects of the particular type(s) should be altered (e.g., for privacy, and/or the like), prior to determining the difference between the data representing the object(s) identified in the image and the data representing the object(s) identified in the decoded version of the image, the processing of the image can include modifying at least a portion of the data representing the object(s) identified in the image to reflect that the object(s) of the particular type(s) were not identified in the image. It will be appreciated that such modification will shift the target to which the ML model(s) are being trained such that the ML model(s) will be configured to encode/decode the images in a manner that alters the image portions including objects of the particular type(s), for example, because the data associated with such image portions will be eliminated, consolidated, and/or the like due to the fact that the resulting degradation will reduce the difference in the objects identified.

In some embodiments, for each image of the multiple different and distinct images that includes one or more objects of the particular type(s) (e.g., people's faces, car license plates, and/or the like) for which image portions including objects of the particular type(s) should be altered (e.g., for privacy, and/or the like), modifying the ML model(s) can be based at least in part on a weighted standard error such that the ML model(s) can be modified to encode the images such that altering of one or more portions of the image including the object(s) of the particular type(s) is mitigated. In some of such embodiments, the weighted standard error can mitigate the altering of such portion(s) of the image such that a human viewing a rendering of a decoded version of the image can identify, in the rendering, the object(s) of the particular type(s) as being of their respective type(s) (e.g., as being a person's face, car license plate, and/or the like).

In some embodiments, one or more of the ML model(s) described herein can be, otherwise include, and/or the like one or more of various types of ML models, such as neural networks (e.g., deep neural networks, and/or the like), other types of ML models, including non-linear models, linear models, multilayer models, and/or the like. Neural networks can include, for example, feed-forward neural networks, recurrent neural networks (e.g., long short-term memory recurrent neural networks, and/or the like), convolutional neural networks, other forms of neural networks, and/or the like. In some embodiments, one or more of the ML model(s) described herein can be trained using supervised techniques, semi-supervised techniques, unsupervised techniques, and/or the like.

The technology described herein can provide a number of technical effects and benefits. For example, the technology described herein can improve the efficacy of the image encoding, while providing strong privacy (e.g., removing traces that the object(s) of the particular type(s) designated for privacy were ever included in the images, as opposed to merely obscuring recognizable aspects of such object(s), and/or the like). Additionally, the technology described herein can obviate the need (e.g., for a user, and/or the like) to manually identify, label, and/or the like object(s) in an image that should be designated for privacy, and/or the like. Further the technology described herein, can conserve resources (e.g., network bandwidth, and/or the like), for example, because compression associated with encoding an image can reduce the amount of data needed to be transmitted, while simultaneously providing privacy for the designated object(s) in the image, and/or the like.

With reference now to the figures, example embodiments of the present disclosure will be discussed in further detail.

Figure 1:
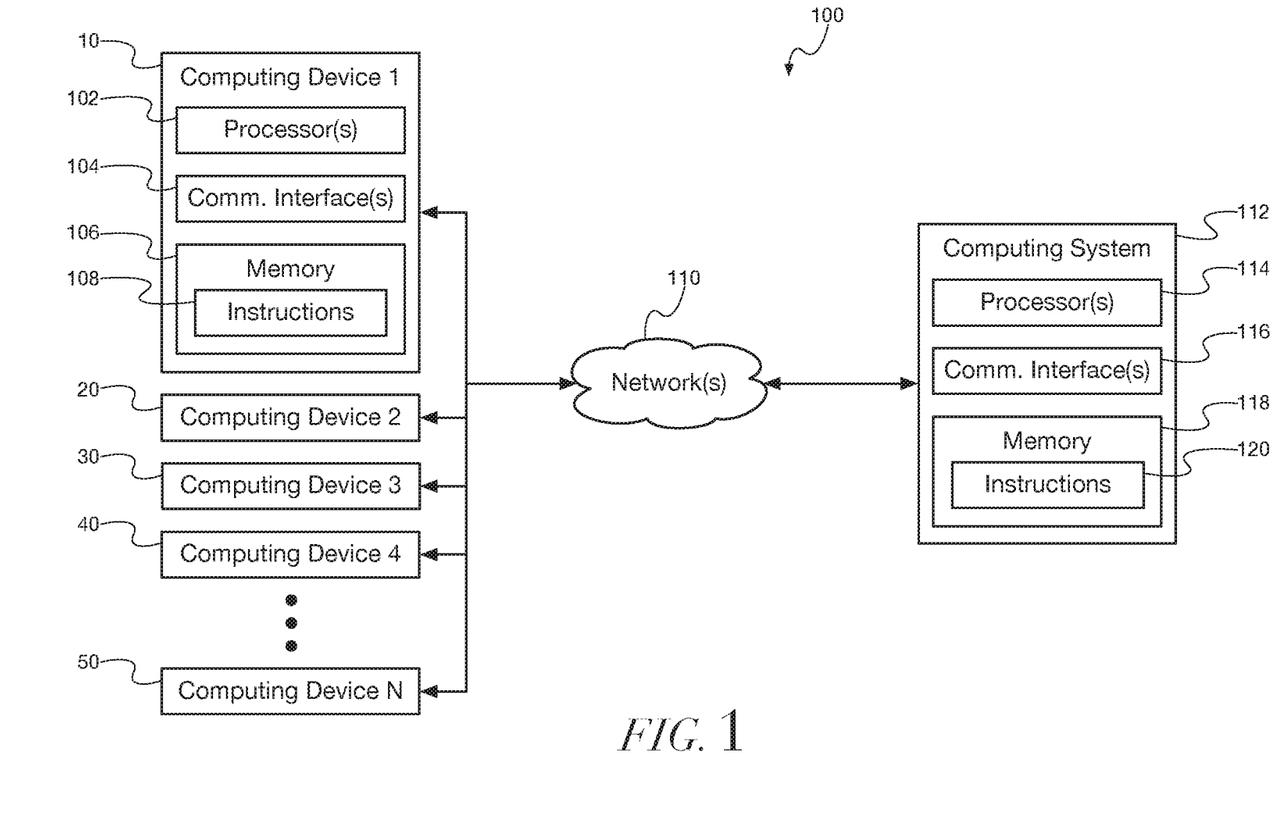
FIG. 1 depicts an example computing environment according to example embodiments of the present disclosure.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, wearable devices, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing device(s) 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing device(s) 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing device(s) 20, 30, 40, and/or 50 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing device(s) 10, 20, 30, 40, and/or 50. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing device(s) 10, 20, 30, 40, and/or 50 and/or computing system 112 (e.g., by computing device 10, 20, 30, 40, or 50, by computing system 112, by a combination of one or more of computing device(s) 10, 20, 30, 40, and/or 50 and/or computing system 112, and/or the like).

Figure 2:
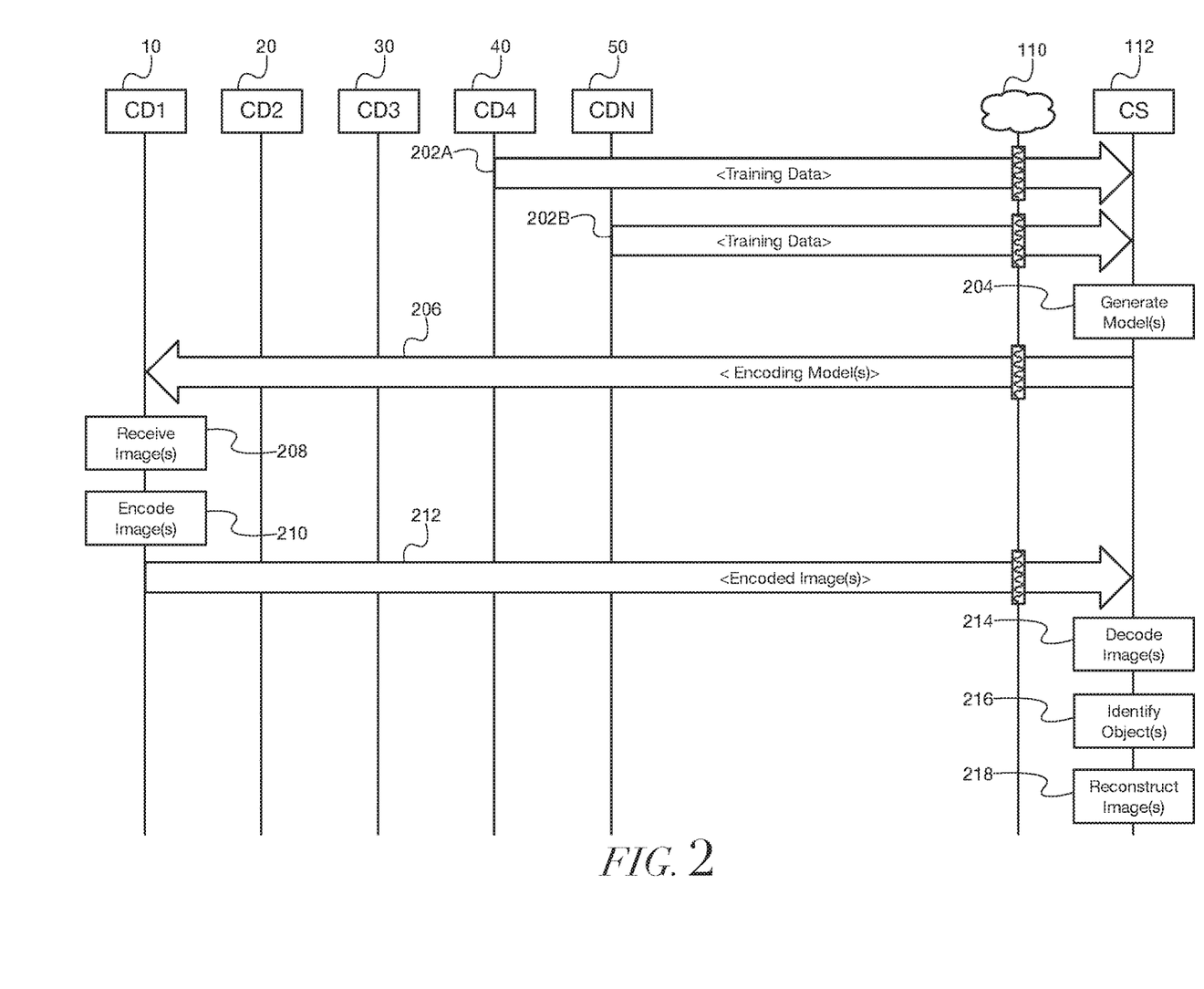
FIG. 2 depicts an example event sequence according to example embodiments of the present disclosure.

FIG. 2 depicts an example event sequence according to example embodiments of the present disclosure.

Referring to FIG. 2, at (202A), computing device 40 can communicate (e.g., via network(s) 110, as indicated by the pattern-filled box over the line extending downward from network(s) 110, and/or the like) data representing multiple different and distinct images (e.g., training data, and/or the like), which can be received by computing system 112. Similarly, at (202B), computing device 50 can communicate data representing multiple different and distinct images (e.g., training data, and/or the like), which can be received by computing system 112. Such images can include at least one image comprising one or more objects of one or more particular types (e.g., people's faces, car license plates, and/or the like) for which image portions including objects of the particular type(s) should be altered (e.g., for privacy, and/or the like).

As will be described in greater detail below (e.g., with respect to FIGS. 3 and 4, and/or the like), at (204), computing system 112 can utilize the data representing the multiple different and distinct images (e.g., the training data, and/or the like) and one or more object-recognition ML models (e.g., pre-trained models, and/or the like) to generate (e.g., train, and/or the like) one or more ML models configured to encode images comprising objects of the particular type(s) in conjunction with one or more ML models configured to decode such images. The ML model(s) can be configured to encode the images such that one or more portions of the images that include one or more objects of the particular type(s) are altered. For example, the ML model(s) can be generated based at least in part on data (e.g., associated with one or more privacy settings, and/or the like) indicating that image portions including objects of the particular type(s) (e.g., people's faces, car license plates, and/or the like) should be altered for privacy, while image portions including objects of one or more other types (e.g., dogs, and/or the like) need not be altered for privacy, and/or the like. Such data can be based at least in part on, for example, one or more user preferences, device settings, application settings, device locations, jurisdictional regulations, privacy policies, and/or the like.

At (206), computing system 112 can communicate data representing the ML model(s) configured to encode the images to computing device 10, which can receive the data.

At (208), computing device 10 can receive (e.g., from a camera, memory, network interface, and/or the like) data representing an image. The image can include various objects (e.g., a person's face, a dog, the license plate of a car, and/or the like).

At (210), based at least in part on the data representing the image and the ML model(s) configured to encode the images, computing device 10 can generate data representing an encoded version of the image, encode the image, and/or the like. As previously indicated, the ML model(s) can be configured to encode the image such that one or more portions of the image that include one or more objects (e.g., the person's face, the license plate of the car, and/or the like) of the particular type(s) are altered such that when the image is decoded, the object(s) are unrecognizable as being of their respective type(s) (e.g., as being a person's face, car license plate, and/or the like) by the object-recognition ML model(s).

In some embodiments, the ML model(s) configured to encode the images can include a single common (e.g., the same, and/or the like) ML model configured to encode the images such that one or more portions of the images that include one or more of multiple different types of objects (e.g., people's faces, car license plates, and/or the like) are altered. Additionally or alternatively, the ML model(s) configured to encode the images can include multiple different and distinct ML models, and each of such ML model(s) can be configured to encode the images such that one or more portions of the images that include one or more of multiple different types of objects are altered. For example, the ML models can include an ML model configured to encode the images to generate data representing modified versions of the images that alter one or more portions of the images that include objects of a first type (e.g., people's faces, and/or the like), and the ML models can include a different and distinct ML model, which can be configured to encode decoded versions of the modified versions of the images such that one or more portions of the images (e.g., included in the modified versions of the images, and/or the like) that include objects of a second type (e.g., car license plates, and/or the like) are altered.

At (212), computing device 10 can communicate the data representing the encoded version of the image to computing system 112, which can receive the data.

At (214), computing system 112 can identify the ML model(s) configured to decode the images and can utilize such ML model(s) and the data representing the encoded version of the image to generate data representing a decoded version of the image, decode the image, and/or the like.

At (216), computing system 112 can utilize one or more of the object-recognition ML model(s) to identify (e.g., recognize, and/or the like) one or more objects (e.g., the dog, and/or the like) in the decoded version of the image as being of their respective type(s) (e.g., as being a dog, and/or the like). The object-recognition ML model(s) may, however, fail to identify (e.g., recognize, and/or the like) one or more other objects (e.g., the person's face, the license plate of the car, and/or the like) in the decoded version of the image as being of their respective type(s) (e.g., as being a person's face, car license plate, and/or the like) because the portion(s) of the image including such object(s) have been altered by the encoding and/or decoding such that the object(s) (e.g., the person's face, the license plate of the car, and/or the like) are unrecognizable as being of their respective type(s) (e.g., as being a person's face, car license plate, and/or the like) by the object-recognition ML model(s).

At (218), computing system 112 can utilize one or more ML models (e.g., autoencoder networks, generative adversarial networks (GANs), and/or the like) to reconstruct, in the decoded version of the image, one or more portions of the image comprising one or more of the object(s) (e.g., the person's face, the license plate of the car, and/or the like) such that a human viewing a rendering of the decoded version of the image can identify (e.g., recognize, and/or the like), in the rendering, such object(s) as being of their respective type(s) (e.g., as being a person's face, car license plate, and/or the like).

Figure 3:
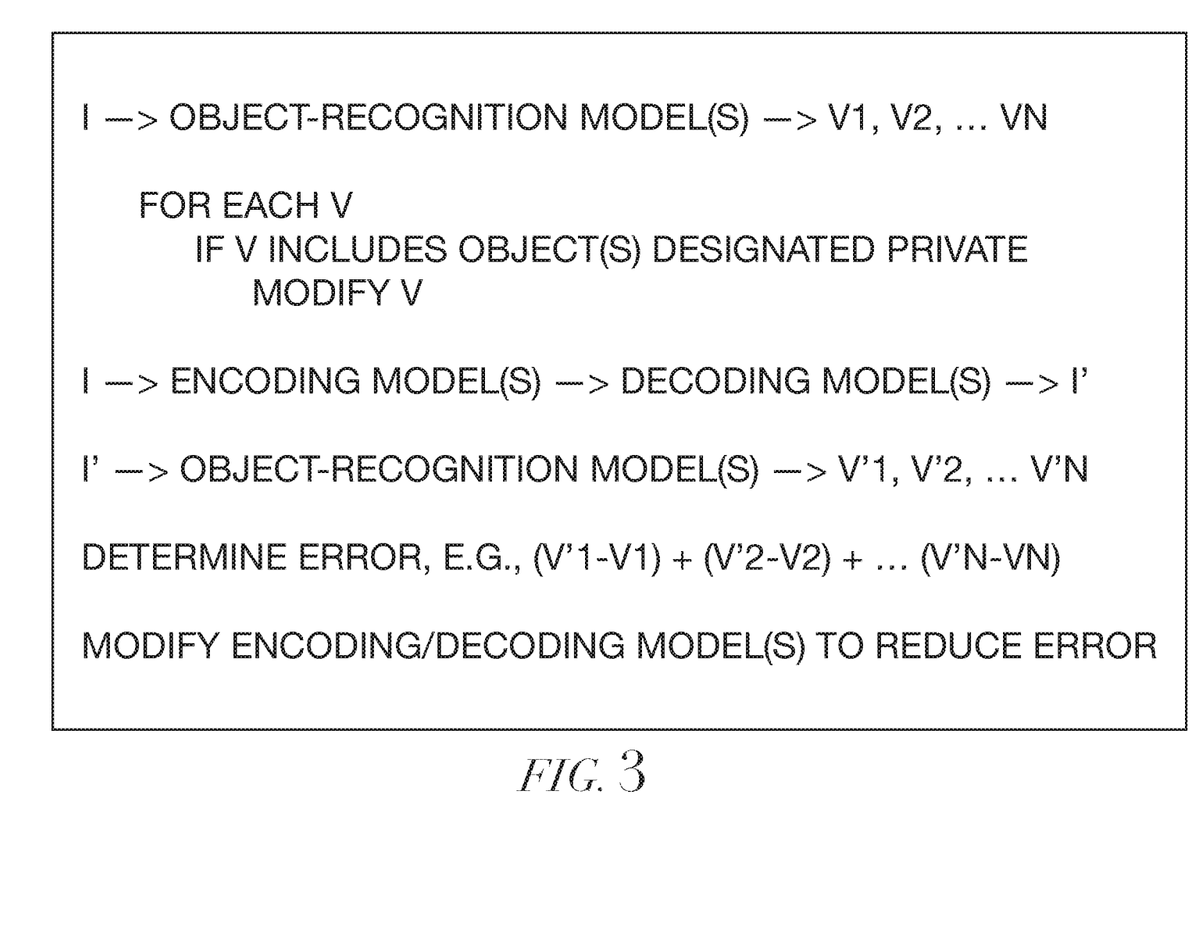
FIG. 3 depicts example pseudo code for generating one or more models according to example embodiments of the present disclosure.
Figure 4:
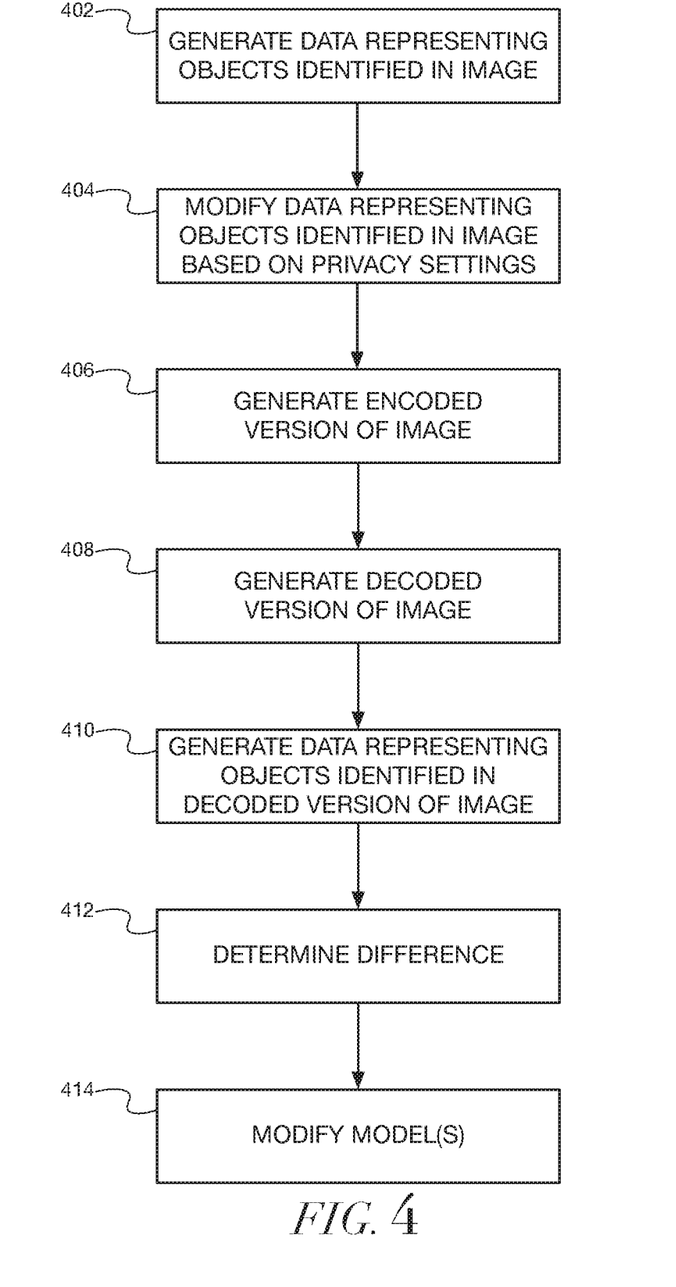
FIG. 4 depicts an example method according to example embodiments of the present disclosure.

FIG. 3 depicts example pseudo code for generating one or more models according to example embodiments of the present disclosure, and FIG. 4 depicts an example method according to example embodiments of the present disclosure.

As previously indicated, the ML model(s) configured to encode the images and/or the ML model(s) configured to decode the images can be generated (e.g., trained, and/or the like) based at least in part on the data representing the multiple different and distinct images (e.g., the training data, and/or the like). For example, each of such multiple different and distinct images can be processed in generating (e.g., training, and/or the like) such ML model(s).

Referring to FIGS. 3 and 4, such processing can include, for each image (e.g., I, and/or the like) of such images, at (402), one or more computing devices (e.g., computing system 112, and/or the like) can utilize the object-recognition ML model(s) (e.g., pre-trained models, and/or the like) to generate data, for example, one or more multi-dimensional vectors (e.g., V1, V2, ... VN), and/or the like, representing one or more objects identified in the image (e.g., I, and/or the like).

At (404), if the image (e.g., I, and/or the like) includes one or more objects of the particular type(s) (e.g., people's faces, car license plates, and/or the like) for which image portions including objects of the particular type(s) should be altered, the computing device(s) can modify at least a portion of the data representing the object(s) identified in the image (e.g., V1, V2, ... VN) to reflect that the object(s) of the particular type(s) were not identified in the image.

At (406), the computing device(s) can utilize the ML model(s) configured to encode the images to generate data representing an encoded version of the image.

At (408), the computing device(s) can utilize the ML model(s) configured to decode the images and the data representing the encoded version of the image to generate data representing a decoded version of the image (e.g., I', and/or the like).

At (410), the computing device(s) can utilize the object-recognition ML model(s) to generate data, for example, one or more multi-dimensional vectors (e.g., V'1, V'2, ... V'N), and/or the like, representing one or more objects identified in the decoded version of the image (e.g., I', and/or the like).

At (412), the computing device(s) can determine a difference, for example, a discrepancy, error (e.g., (V' 1−V1)+ (V'2−V2)+ ... (V'N−VN)), and/or the like, between the data representing the object(s) identified in the image and the data representing the object(s) identified in the decoded version of the image.

At (414), the computing device(s) can modify one or more of the ML model(s) configured to encode the images and/or one or more of the ML model(s) configured to decode the images such that the modifying reduces the difference between the data representing the object(s) identified in the image and the data representing the object(s) identified in the decoded version of the image, for example, by evaluating a function based at least in part on the difference (e.g., back-propagating the difference through one or more of such ML model(s), utilizing one or more evolutionary algorithms, other suitable ML training paradigms, and/or the like). The difference can be determined at any suitable level (e.g., L1, L2, and/or the like), using any suitable approach (e.g., simple error, absolute value, sum of squares, and/or the like). It will be appreciated that by processing the images in such a manner, the ML model(s) can be configured to minimize, reduce, and/or the like the difference in the objects identified, as opposed to, for example, traditional compression, which seeks to minimize, reduce, and/or the like the pixel-wise difference.

In some embodiments, for each image of the multiple different and distinct images that includes one or more objects of the particular type(s) (e.g., people's faces, car license plates, and/or the like) for which image portions including objects of the particular type(s) should be altered (e.g., for privacy, and/or the like), modifying the ML model (s) can be based at least in part on a weighted standard error such that the ML model(s) can be modified to encode the images such that altering of one or more portions of the image including the object(s) of the particular type(s) is mitigated. In some of such embodiments, the weighted standard error can mitigate the altering of such portion(s) of the image such that a human viewing a rendering of a decoded version of the image can identify, in the rendering, the object(s) of the particular type(s) as being of their respective type(s) (e.g., as being a person's face, car license plate, and/or the like).

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/ or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one of ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a further embodiment. Thus, it is intended that the present disclosure cover such alterations, variations, and/or equivalents.

What is claimed is:

1. A computer-implemented method comprising:
   receiving, by one or more computing devices, data representing one or more machine learning (ML) models configured, at least in part, to encode images comprising objects of a particular type;
   receiving, by the one or more computing devices, data representing an image comprising one or more objects of the particular type;
   generating, by the one or more computing devices and based at least in part on the data representing the image and the data representing the one or more ML models, data representing an encoded version of the image that alters at least a portion of the image comprising the one or more objects such that when the encoded version of the image is decoded, the one or more objects are unrecognizable as being of the particular type by one or more object-recognition ML models based at least in part upon which the one or more ML models configured to encode the images were trained; and
   communicating, by the one or more computing devices and to a remotely located computing system, the data representing the encoded version of the image, wherein the remotely located computing system is configured to:
      receive the data representing the encoded version of the image; and
      generate, based at least in part on the data representing the encoded version of the image and one or more ML models trained in conjunction with the one or more ML models configured to encode the images, data representing a decoded version of the image in which the one or more objects are unrecognizable as being of the particular type by the one or more object-recognition ML models.

2. The computer-implemented method of claim 1, wherein:
   generating the data representing the encoded version of the image comprises generating data representing the encoded version of the image such that one or more objects of a different type from the particular type are recognizable in the decoded version of the image as being of the different type by at least one of the one or more object-recognition ML models, and
   the remotely located computing system is configured to utilize the at least one of the one or more object-recognition ML models to identify the one or more objects of the different type in the decoded version of the image as being of the different type.

3. A system comprising:
   one or more processors; and
   a memory storing instructions that when executed by the one or more processors cause the system to perform operations comprising:
      receiving, from a remotely located computing device, data representing an encoded version of an image comprising one or more objects of a particular type, the encoded version of the image altering at least a portion of the image comprising the one or more objects such that when the encoded version of the image is decoded, the one or more objects are unrecognizable as being of the particular type by one or more object-recognition machine learning (ML) models;
      identifying data representing one or more ML models generated based at least in part on the one or more object-recognition ML models;
      generating, based at least in part on the data representing the encoded version of the image and the data representing the one or more ML models generated based at least in part on the one or more object-recognition ML models, data representing a decoded version of the image in which the one or more objects are unrecognizable as being of the particular type by the one or more object-recognition ML models, wherein generating the data representing the decoded version of the image comprises generating data representing the decoded version of the image such that one or more objects of a different type from the particular type are recognizable in the decoded version of the image as being of the different type by at least one of the one or more object-recognition ML models; and utilizing the at least one of the one or more object-recognition ML models to identify the one or more objects of the different type in the decoded version of the image as being of the different type.

4. The system of claim 3, wherein:
the image comprises one or more objects of a second different type from the particular type;
the data representing the encoded version of the image comprises data that alters at least a portion of the image comprising the one or more objects of the second different type such that when the encoded version of the image is decoded, the one or more objects of the second different type are unrecognizable as being of the second different type by the one or more object-recognition ML models; and
the one or more objects of the second different type are unrecognizable, in the decoded version of the image, as being of the second different type by the one or more object-recognition ML models.

5. The system of claim 4, wherein the data representing the encoded version of the image comprises data generated based at least in part on a common ML model configured to encode the image such that the encoded version of the image alters:
the at least a portion of the image comprising the one or more objects of the particular type such that when the encoded version of the image is decoded, the one or more objects of the particular type are unrecognizable as being of the particular type by the one or more object-recognition ML models; and
the at least a portion of the image comprising the one or more objects of the second different type such that when the encoded version of the image is decoded, the one or more objects of the second different type are unrecognizable as being of the second different type by the one or more object-recognition ML models.

6. The system of claim 4, wherein the data representing the encoded version of the image comprises data generated based at least in part on:
a first ML model configured to encode the image to generate data representing a modified version of the image such that the modified version of the image alters the at least a portion of the image comprising the one or more objects of the particular type such that when the modified version of the image is decoded, the one or more objects of the particular type are unrecognizable as being of the particular type by the one or more object-recognition ML models; and
a second ML model configured to encode a decoded version of the modified version of the image to generate data representing the encoded version of the image such that the encoded version of the image alters the at least a portion of the image comprising the one or more objects of the second different type such that when the encoded version of the image is decoded, the one or more objects of the second different type are unrecognizable as being of the second different type by the one or more object-recognition ML models, the second ML model being different and distinct from the first ML model.

7. The system of claim 3, wherein the operations comprise utilizing one or more ML models to reconstruct, in the decoded version of the image, the at least a portion of the image comprising the one or more objects such that a human viewing a rendering of the decoded version of the image can identify, in the rendering, the one or more objects as being of the particular type.

8. One or more non-transitory computer-readable media comprising instructions that when executed by one or more computing devices cause the one or more computing devices to perform operations comprising:
receiving data representing a plurality of different and distinct images that includes at least one image comprising an object of a particular type; and
generating, based at least in part on the data representing the plurality of different and distinct images and one or more object-recognition machine learning (ML) models, one or more ML models configured to encode images comprising one or more objects of the particular type such that when the images are decoded, the one or more objects are unrecognizable as being of the particular type by the one or more object-recognition ML models; and
generating, based at least in part on the data representing the plurality of different and distinct images and the one or more object-recognition ML models, one or more ML models configured to decode the images comprising the one or more objects to produce decoded images such that the one or more objects are unrecognizable in the decoded images as being of the particular type by the one or more object-recognition ML models.

9. The one or more non-transitory computer-readable media of claim 8, wherein generating the one or more ML models configured to encode the images comprises, for each image of the plurality of different and distinct images:
generating, based at least in part on the one or more object-recognition ML models, data representing one or more objects identified in the image;
generating, based at least in part on the one or more ML models configured to encode the images, data representing an encoded version of the image;
generating, based at least in part on the data representing the encoded version of the image and one or more ML models configured to decode images, data representing a decoded version of the image;
generating, based at least in part on the one or more object-recognition ML models, data representing one or more objects identified in the decoded version of the image;
determining a difference between the data representing the one or more objects identified in the image and the data representing the one or more objects identified in the decoded version of the image; and
modifying the one or more ML models configured to encode the images such that the modifying reduces the difference between the data representing the one or more objects identified in the image and the data representing the one or more objects identified in the decoded version of the image.

10. The one or more non-transitory computer-readable media of claim 9, wherein generating the one or more ML models configured to encode the images comprises, for each image of the plurality of different and distinct images that comprises at least one object of the particular type and prior to determining the difference between the data representing the one or more objects identified in the image and the data representing the one or more objects identified in the decoded version of the image, modifying at least a portion of the data representing the one or more objects identified in the image that corresponds to the at least one object of the particular type to reflect that the at least one object of the particular type was not identified in the image.

11. The one or more non-transitory computer-readable media of claim 9, wherein, for each image of the plurality of different and distinct images that comprises at least one object of the particular type, modifying the one or more ML models comprises modifying, based at least in part on a weighted standard error, the one or more ML models to encode the images such that altering of one or more portions of the image comprising the at least one object of the particular type is mitigated.

12. The one or more non-transitory computer-readable media of claim 11, wherein the weighted standard error mitigates the altering of the one or more portions of the image comprising the at least one object of the particular type such that a human viewing a rendering of a decoded version of the image can identify, in the rendering, the at least one object of the particular type as being of the particular type.

13. The one or more non-transitory computer-readable media of claim 8, wherein generating the one or more ML models configured to encode the images comprises generating the one or more ML models configured to encode the images such that one or more objects of a different type from the particular type are recognizable in the decoded images as being of the different type by at least one of the one or more object-recognition ML models.

14. The one or more non-transitory computer-readable media of claim 13, wherein generating the one or more ML models configured to encode the images comprises generating the one or more ML models configured to encode the images based at least in part on data indicating:
one or more image portions including objects of the particular type should be altered for privacy; and
one or more image portions including objects of the different type need not be altered for privacy.

15. A computer-implemented method comprising:
receiving, by one or more computing devices, data representing one or more machine learning (ML) models configured, at least in part, to encode images comprising objects of a particular type;
receiving, by the one or more computing devices, data representing an image comprising one or more objects of the particular type; and
generating, by the one or more computing devices and based at least in part on the data representing the image and the data representing the one or more ML models, data representing an encoded version of the image that alters at least a portion of the image comprising the one or more objects such that when the encoded version of the image is decoded, the one or more objects are unrecognizable as being of the particular type by one or more object-recognition ML models based at least in part upon which the one or more ML models configured to encode the images were trained;
wherein the image comprises one or more objects of a different type from the particular type;
wherein the one or more ML models configured to encode the images are configured to encode images comprising objects of the different type; and
wherein generating the data representing the encoded version of the image comprises generating data representing the encoded version of the image such that the encoded version of the image alters at least a portion of the image comprising the one or more objects of the different type such that when the encoded version of the image is decoded, the one or more objects of the different type are unrecognizable as being of the different type by the one or more object-recognition ML models.

16. The computer-implemented method of claim 15, wherein generating the data representing the encoded version of the image comprises utilizing a common ML model of the one or more ML models configured to encode the images to generate data representing the encoded version of the image such that the encoded version of the image alters:
the at least a portion of the image comprising the one or more objects of the particular type such that when the encoded version of the image is decoded, the one or more objects of the particular type are unrecognizable as being of the particular type by the one or more object-recognition ML models; and
the at least a portion of the image comprising the one or more objects of the different type such that when the encoded version of the image is decoded, the one or more objects of the different type are unrecognizable as being of the different type by the one or more object-recognition ML models.

17. The computer-implemented method of claim 15, wherein generating the data representing the encoded version of the image comprises:
utilizing a first ML model of the one or more ML models configured to encode the images to encode the image to generate data representing a modified version of the image such that the modified version of the image alters the at least a portion of the image comprising the one or more objects of the particular type such that when the modified version of the image is decoded, the one or more objects of the particular type are unrecognizable as being of the particular type by the one or more object-recognition ML models; and
utilizing a second ML model of the one or more ML models configured to encode the images to encode a decoded version of the modified version of the image to generate data representing the encoded version of the image such that the encoded version of the image alters the at least a portion of the image comprising the one or more objects of the different type such that when the encoded version of the image is decoded, the one or more objects of the different type are unrecognizable as being of the different type by the one or more object-recognition ML models, the second ML model being different and distinct from the first ML model.

* * * * *